United States Patent Office 3,753,953
Patented Aug. 21, 1973

3,753,953
HYDROLYSIS-RESISTANT POLYESTERURETHANE THREADS AND PREPARATION THEREOF
Cornelis Jan Leeuwerik, Velp, Franciscus Johannes Huntjens, Arnhem, and Cornelis Martinus Franciscus Vrouenraets, Dieren, Netherlands, assignors to AKZO N.V. Arnhem, Netherlands
No Drawing. Filed June 11, 1971, Ser. No. 152,389
Claims priority, application Netherlands, June 13, 1970, 7008630
Int. Cl. C08g 22/10
U.S. Cl. 260—75 NK       8 Claims

ABSTRACT OF THE DISCLOSURE

A method for producing polyester-urethane elastomer threads is disclosed wherein the polyester portion is formed by reacting adipic acid with 2,2,4-trimethylhexanediol-1,6 and/or 2,4,4-trimethylhexanediol-1,6. The resulting products have excellent mechanical properties and a very high hydrolytic stability.

---

The invention relates to a method for the production of threads from a polyester-urethane elastomer formed by reacting a polyester having a molecular weight between about 500 and about 5,000 of adipic acid and one or more diols with a diisocyanate and then with a chain extender, and forming the elastomer into threads.

A similar method is described in U.S. Pat. No. 3,097,192. However, in order that the elastomeric threads manufactured by said method have the require properties. it is necessary that very special combinations of polyester, diisocyanate and chain extender be used.

Furthermore, U.S. Pat. 3,496,144 describes the manufacture of threads from a polyester-urethane prepared by causing a polyester from adipic acid and a mixture of hexanediol-1,6 and 2,2,4-trimethyl-pentanediol-1,3 to react with a diisocyanate and subsequently with a chain extender.

An object of the instant invention is to provide elastomeric threads of improved quality, for instance, having excellent mechanical properties and a very high hydrolytic stability in various media such as boiling water, lye or a urea solution.

The term "threads" is meant to include continuous mono- and multifilament threads, staple fibres, skeins, and the products made therefrom, e.g., woven fabrics, knitted fabrics, non-woven products, and the like.

The polyester-urethane elastomeric threads disclosed herein may entirely or partly consist of the polyesterurethane elastomer more specifically described.

The invention is characterized in that the polyester of the polyester-urethane is prepared from adipic acid and from 2,2,4- and/or 2,4,4-trimethyl-hexanediol-1,6. In order to obtain optimum mechanical properties, it is preferred that the polyester have a molecular weight between about 1,2000 and about 2,500.

The polyester may be prepared from adipic acid and one or both of the trimethyl-hexanediols-1,6 by any suitable method. It is preferred that a mixture of two diols in a weight ratio of approximately 1:1 be used; however, the hexanediols may also be used singly.

In addition to the 2,2,4- and/or 2,4,4-trimethylhexanediol-1,6 one or more different diols, e.g., those having from 2 to 8 carbon atoms may be used in the preparation of the polyester. Examples of such diols are hexanediol, pentanediol, butanediol, and propanediol. It is preferred that hexanediol-1,6 be used. When present in relatively large quantities with the 2,2,4- and/or 2,4,4-trimethylhexanediol-1,6, it does not impair the favorable effects of the trimethyl-hexanediol-1,6. It is preferred that the hexanediol-1,6 be used in a molar ratio of hexanediol-1,6 to the trimethyl-hexanediol-1,6 of between 0 and 10.

In addition to adipic acid, one may use, if desired, small amounts of one or more different dicarboxylic acids, such as sebacic acid.

The preparation of the polyester usually takes place in the melt wherein the water formed in the reaction is removed until the molecular weight of the polyester is in the range of about 500 and about 5,000. A conventional catalyst may be used in the preparation of the polyester, if desired. The pressure applied in the reaction is not critical; at the start, it is generally atmospheric, but in a second step, it is considerably reduced to about less than 10 mm. Hg, in order to obtain a polyester having the desired molecular weight.

In the reaction of the polyester with a diisocyanate, different types of diisocyanate can be used, for instance, a mixture of toluenediisocyanate-2,4 and toluenediisocyanate-2,6. It is preferred to use diphenylmethane 4,4'-diisocyanate or meta- or paraxylylene-diisocyante, because the elastomer thus prepared will possess a relatively high modulus as well as a relatively low quickset. It will also show improved light stability. Mixtures of diisocyanates may also be used.

In the reaction of the diisocyanate with the polyester, the molar ratio of these components is generally between about 1.2 and 10. Between 1.3 to 6.0 is preferred because the elastomer yarn will have optimum mechanical properties.

The reaction usually takes place in the melt or in solution. The reaction temperature is usually between 40 and 130° C. The pressure applied generally is atmospheric, but it may be higher or lower. If desired, the reaction may be carried out stepwise, in which case in the second step diisocyanate may, or may not, be added again.

By the method according to the invention the product of the reaction of diisocyanate with the polyester is subsequently reacted with a chain extender. The chain extender used may be a diamine such as an alkylene diamine having the general formula $(CH_2)_n(NH_2)_2$, where $n=0-6$, for instance, tetramethylene diamine, pentamethylene diamine, hexamethylene diamine or a dialcohol, or a glycol. The use of hydrazine or ethylene diamine is preferred. The reaction with the chain extender takes place in the usual manner, i.e., in an aprotic polar solvent such as dimethyl formamide, dimethyl acetamide, dimethyl sulfoxide, N-methylpyrrolidone, hexamethylphosphortriamide. These solvents may be mixed with smaller amounts of a different dispersing agent such as dioxane or tetrahydrofuran. The reaction temperature may vary between wide limits, for instance, between —30° C. and +80° C., but preferably between 0° and 40° C. The pressure to be applied is not critical.

If, in addition to or instead of the chain extender, one uses a diamine having a tertiary nitrogen atom, a product is obtained having a considerably improved and excellent affinity for acid or disperse dyestuffs, for 1:2 metal complex dyes, or for optical brighteners. Compounds which lead to improved dye affinity are, for instance, N,N-bis (propylamine) methylamine, and N,N-bis(propylamine) piperazine.

The chain extender is used in an amount such that the elastomer to be obtained will have a relative viscosity of at least 1.6, but preferably at least 2.5. The relative viscosity is measured for solutions of 1 g. elastomer in 100 ml. of dimethyl formamide at 25° C.

The elastomer may be formed into various products. For instance, threads may be formed by a wet or dryspinning process or by extrusion.

For the processing of the polyurethane, the elastomer may be mixed with the usual additives, such as pigments, fillers, carbon black, titanium dioxide, UV-stabilizers, antioxidants, fire-retarding compounds and the like.

The invention also relates to the elastomer manufactured by the afore-described method. They may be represented by the general formula

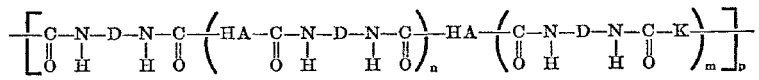

where HA represents the group formed by abstracting the two terminal hydrogen atoms from a polyester prepared from adipic acid and from 2,2,4- and/or 2,4,4-trimethylhexanediol-1,6 having a molecular weight in the range of 500 to 5,000; D represents the group formed by abstracting the two terminal isocyanate groups from a diisocyanate, D preferably being an arylene or alkylidene group, K represents the group formed by abstracting the two terminal active hydrogen atoms from the chain extender molecule, $n$ is a number between 0 and 4, $m$ is a number between 1 and 10, and $p$ is the degree of polymerization.

The invention will be further described in the following examples. The elastomer properties mentioned therein are determined as follows.

The quickest is measured as the length increase expressed in percent of the original length after elongation to 300% of the original length at a rate of 1000%/min., followed by eliminating the elongation and immediately measuring the increase in length. The afore-described stretch cycle is repeated four times. The stress decay in percent (at 300% elongation) is given by $$\frac{S_1(300) - S_5(300)}{S_1(300)}$$

×100%, $S_1(300)$ and $S_5(300)$ standing for the stress at elongation to 300% in the first and fifth stretch cycles, respectively. The stress at elongation to, respectively, 150 and 300%, is the stress at the elongation indicated for the first stretch cycle. The tensile strength and the elongation at break are measured at an elongation rate of 1000%/min.

EXAMPLE 1

Three samples of 25 g. of a polyester of adipic acid and a 1:1 mixture of 2,2,4-trimethylhexanediol-1,6 and 2,4,4-trimethylhexanediol-1,6 with a molecular weight of 1330, 1545, and 1930, respectively, were dried to reduce the water content to less than 0.02% by weight. They were then reacted with diphenylmethane 4,4'-diisocyanate in a molar ratio of the diisocyanate to the polyester of 3:2. The reaction was carried out for 60 minutes at 90° C., with vigorous stirring in a nitrogen atmosphere. At a temperature lower than 40° C. the resulting melt was then dissolved in 150 ml. of dimethylacetamide, followed by cooling to a temperature in the range of 0 to 5° C. To this solution was added ethylene diamine in 25 ml. dimethylacetamide, the ethylene diamine being used in an amount equal to that of the free isocyanate groups in the reaction product of the diisocyanate and the polyester. After a stirring time of 15 minutes the resulting elastomer solution was wet-spun in water into an approximately 150-denier yarn which was dried for 14 hours at 70° C. The yarn obtained was found to have the following properties.

|  | Molecular weight of polyester | | |
| --- | --- | --- | --- |
|  | 1,330 | 1,545 | 1,930 |
| Tensile strength (kg./cm.²) | 680 | 630 | 320 |
| Elongation at break (percent) | 580 | 590 | 650 |
| Stress at 300% elongation (kg./cm.²) | 161 | 126 | 73 |
| Stress at 150% elongation (kg./cm.²) | 85 | 60 | 26 |
| Quickset (percent) | 9 | 9 | 7 |
| Stress decay (percent) | 37 | 26 | 16 |

EXAMPLE 2

The experiment described in Example 1 was repeated, while using a polyester having a molecular weight of 1600. In this experiment, the chain extender was hexamethylene diamine, and instead of dimethylacetamide, dimethyl formamide was used.

The resulting yarn had the following properties.

| | |
| --- | --- |
| Tensile strength (kg./cm.²) | 400 |
| Elongation at break (percent) | 650 |
| Stress at 300% elongation (kg./cm.²) | 95 |
| Stress at 150% elongation (kg./cm.²) | 70 |
| Quickset (percent) | 10 |
| Stress decay (percent) | 25 |

EXAMPLE 3

The experiment described in Example 1 was repeated while using the polyester having a molecular weight of 1930; but in this experiment the molar ratio of the diisocyanate to the polyester was 2:1. The yarn obtained had the following properties.

| | |
| --- | --- |
| Tensile strength (kg./cm.²) | 630 |
| Elongation at break (percent) | 540 |
| Stress at 300% elongation (kg./cm.²) | 216 |
| Stress at 150% elongation (kg./cm.²) | 104 |
| Quickset (percent) | 18 |
| Stress decay (percent) | 35 |

EXAMPLE 4

Example 1 was repeated twice, except that use was made of 2 different starting polyesters prepared from adipic acid, a 1:1 mixture of 2,2,4-trimethylhexanediol-1,6 and 2,4,4-trimethylhexanediol-1,6 and hexanediol-1,6, which last-mentioned component was used in a ratio to the trimethylhexanediol of 3:1 (Experiment A) and 7:5 (Experiment B), respectively. The molecular weights of the polyesters were 1170 and 1230, respectively. The resulting yarns had the following properties.

|  | Experiment | |
| --- | --- | --- |
|  | A | B |
| Tensile strength (kg./cm.²) | 800 | 730 |
| Elongation at break (percent) | 540 | 540 |
| Stress at 300% elongation (kg./cm.²) | 167 | 159 |
| Stress at 150% elongation (kg./cm.²) | 58 | 66 |
| Quickset (percent) | 9 | 9 |
| Stress decay (percent) | 28 | 33 |

EXAMPLE 5

Example 4 was repeated, except that use was made of N,N-bis(propylamine)methylamine in a ratio to ethylene diamine of 1:4. The use of Nylosan Red E-8L, Nylosan Yellow 5-GL (both are acid dyestuffs), Cibacet Blue F-3R (disperse dyestuff), or Vialon fast Black RL resulted in excellently dyed yarns whose mechanical properties were not affected.

What is claimed is:
1. A polyurethane elastomer formed by reacting
   a polyester having a molecular weight from about 500 to about 5000 formed from equal molar proportions of adipic acid and a diol selected from the group consisting of 2,2,4-trimethylhexanediol-1,6 and 2,4,4-trimethylhexanediol-1,6 with
   an organic diisocyanate and then with
   a chain extender selected from the group consisting of diamines, hydrazines, hydrazides and diols.
2. The elastomer of claim 1 wherein said polyester is prepared using a diol mixture consisting of approximately equal parts by weight of 2,2,4-trimethylhexanediol-1,6 and 2,4,4-trimethylhexanediol-1,6.
3. The elastomer of claim 1 wherein the molar ratio of said diisocyanate to said polyester is between 1.2 and 10.

4. The elastomer of claim 1 wherein said chain extender is ethylenediamine.

5. The elastomer of claim 1 wherein said polyester is formed from an additional diol containing from 2 to 8 carbon atoms and wherein the molar ratio of additional diol to the trimethylhexanediol-1,6 is up to 10.

6. The elastomer of claim 5 wherein said diol mixture contains up to 10 moles of hexanediol-1,6 per mole of 2,2,4- or 2,4,4-trimethylhexanediol-1,6.

7. The elastomer of claim 1, having a relative viscosity of at least 1.6 measured at a concentration of 1 g. elastomer in 100 ml. of dimethylformamide at 25° C.

8. The elastomer of claim 1 in the form of a thread.

References Cited
UNITED STATES PATENTS

| | | | |
|---|---|---|---|
| 3,461,101 | 8/1969 | Oertel et al. | 260—75 |
| 3,471,447 | 10/1969 | Kunde et al. | 260—75 |
| 3,475,377 | 10/1969 | Rosendahl et al. | 260—75 |
| 3,496,144 | 2/1970 | Kunde et al. | 260—75 |
| 3,600,358 | 8/1971 | Taub | 260—75 |

DONALD E. CZAJA, Primary Examiner

H. S. COCKERAM, Assistant Examiner

U.S. Cl. X.R.

260—75 NH, 77.5 SP